(12) United States Patent
Araumi et al.

(10) Patent No.: US 11,515,782 B2
(45) Date of Patent: Nov. 29, 2022

(54) SWITCHING CONTROL CIRCUIT AND POWER SUPPLY CIRCUIT

(71) Applicant: FUJI ELECTRIC CO., LTD., Kawasaki (JP)

(72) Inventors: Ryuunosuke Araumi, Hino (JP); Ryuji Yamada, Hachioji (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 59 days.

(21) Appl. No.: 17/032,927

(22) Filed: Sep. 25, 2020

(65) Prior Publication Data

US 2021/0111638 A1    Apr. 15, 2021

(30) Foreign Application Priority Data

Oct. 15, 2019   (JP) .............................. JP2019-188843

(51) Int. Cl.
*H02M 1/42*      (2007.01)
*H02M 1/44*      (2007.01)
*H02M 1/12*      (2006.01)

(52) U.S. Cl.
CPC ........... *H02M 1/4225* (2013.01); *H02M 1/44* (2013.01); *H02M 1/123* (2021.05)

(58) Field of Classification Search
CPC ....... H02M 1/12–126; H02M 1/14–15; H02M 1/42–4208; H02M 1/4225; H02M 1/44; H02M 3/155–1588
See application file for complete search history.

(56) References Cited

U.S. PATENT DOCUMENTS

| 2009/0309564 | A1* | 12/2009 | Zafarana ............. | H02M 3/1584 323/282 |
| 2010/0097829 | A1* | 4/2010 | Uno ........................ | H02M 1/44 363/124 |
| 2010/0149842 | A1* | 6/2010 | McPhalen ............... | H02M 1/44 363/39 |
| 2012/0250381 | A1* | 10/2012 | Takahashi ........... | H02M 1/4225 363/124 |
| 2012/0281448 | A1* | 11/2012 | Xu ....................... | H02M 1/4225 363/126 |
| 2013/0100715 | A1* | 4/2013 | Lin ......................... | H02M 1/44 363/21.17 |
| 2017/0099004 | A1* | 4/2017 | Nishijima ............... | H02M 1/36 |

(Continued)

FOREIGN PATENT DOCUMENTS

| JP | 2003-153542 A | 5/2003 | |
| JP | 3899395 B2 * | 3/2007 | ............... H03L 7/07 |

(Continued)

*Primary Examiner* — Fred E Finch, III
(74) *Attorney, Agent, or Firm* — Rabin & Berdo, P.C.

(57) ABSTRACT

A switching control circuit that controls switching of a switching device, the switching control circuit includes a frequency modulation circuit that generates an oscillator signal, and modulates a frequency of an oscillator signal with a predetermined frequency and a modulation index of two or more, and a drive circuit that drives the switching device in response to a signal corresponding to the modulated oscillator signal, the predetermined frequency being higher than a frequency indicative of a value that is a quarter of a half width of a bandpass filter used for measuring noise generated when the switching device is driven.

21 Claims, 15 Drawing Sheets

(56) References Cited

U.S. PATENT DOCUMENTS

| | | | |
|---|---|---|---|
| 2017/0187292 A1* | 6/2017 | Schaemann | G01R 23/02 |
| 2017/0272116 A1* | 9/2017 | Yu | H02M 1/44 |
| 2017/0294844 A1* | 10/2017 | Nishijima | H02M 3/33569 |
| 2018/0109198 A1* | 4/2018 | Kolar | H02M 1/44 |
| 2019/0288541 A1* | 9/2019 | Ogura | H02J 7/025 |
| 2019/0288568 A1* | 9/2019 | Ogura | H02J 50/10 |
| 2020/0067407 A1* | 2/2020 | Kashiwagi | H02M 3/33507 |
| 2021/0006094 A1* | 1/2021 | Shijo | H02J 50/40 |
| 2021/0376716 A1* | 12/2021 | Liu | H02M 3/155 |

FOREIGN PATENT DOCUMENTS

| | | | | |
|---|---|---|---|---|
| JP | 2010-279111 A | 12/2010 | | |
| JP | 2019028907 A | * | 2/2019 | H03L 7/07 |

* cited by examiner

SWITCHING CONTROL CIRCUIT AND POWER SUPPLY CIRCUIT

CROSS-REFERENCE TO RELATED APPLICATION

The present application claims priority pursuant to 35 U.S.C. § 119 from Japanese patent application number 2019-188843 filed on Oct. 15, 2019, the entire disclosure of which is hereby incorporated by reference herein.

BACKGROUND

Technical Field

The present disclosure relates to a switching control circuit and a power supply circuit.

Description of the Related Art

For example, when switching a switching device of a power supply circuit that generates a direct current (DC) voltage from an alternating current (AC) voltage, a leakage current may flow to the ground via a parasitic capacitance of the switching device (for example, Japanese Patent Application Publication No. 2003-153542).

Incidentally, the leakage current generated when the switching device is switched may cause large noise between the ground and the input terminal of the power supply circuit applied with the AC voltage. As a result, another electronic device applied with the AC voltage may be affected by the noise generated at the input terminal.

The present disclosure has been achieved in view of an issue described above, and an object of the present disclosure is to provide a switching control circuit capable of reducing noise caused when a switching device is switched.

SUMMARY

A first aspect of the present disclosure for solving an issue described above is a switching control circuit that controls switching of a switching device, the switching control circuit comprising: a frequency modulation circuit that generates an oscillator signal, and modulates a frequency of the oscillator signal with a predetermined frequency and a modulation index of two or more; and a drive circuit that drives the switching device in response to a signal corresponding to the modulated oscillator signal, the predetermined frequency being higher than a frequency indicative of a value that is a quarter of a half width of a bandpass filter used for measuring noise generated when the switching device is driven.

In addition, a second aspect of the present disclosure is a power supply circuit configured to generate an output voltage from an AC voltage, the power supply circuit comprising: a rectifier circuit that rectifies the AC voltage; an inductor to which the rectified AC voltage from the rectifier circuit is applied; a switching device con figured to control an inductor current flowing through the inductor; and a switching control circuit that controls switching of the switching device based on the inductor current and the output voltage, the switching control circuit including: a frequency modulation circuit that generates an oscillator signal, and modulates a frequency of the oscillator signal with a predetermined frequency and a modulation index of two or more; and a drive circuit that drives the switching device, in response to a signal corresponding to the modulated oscillator signal, the predetermined frequency being higher than a frequency indicative of a value that is a quarter of a half width of a bandpass filter used for measuring noise generated when the switching device is driven.

According to the present disclosure, it is possible to provide a switching control circuit capable of reducing noise caused when the switching device is switched.

DETAILED DESCRIPTION

At least following matters will become apparent from the description in the present specification and the accompanying drawings.

Embodiment

Figure 1:
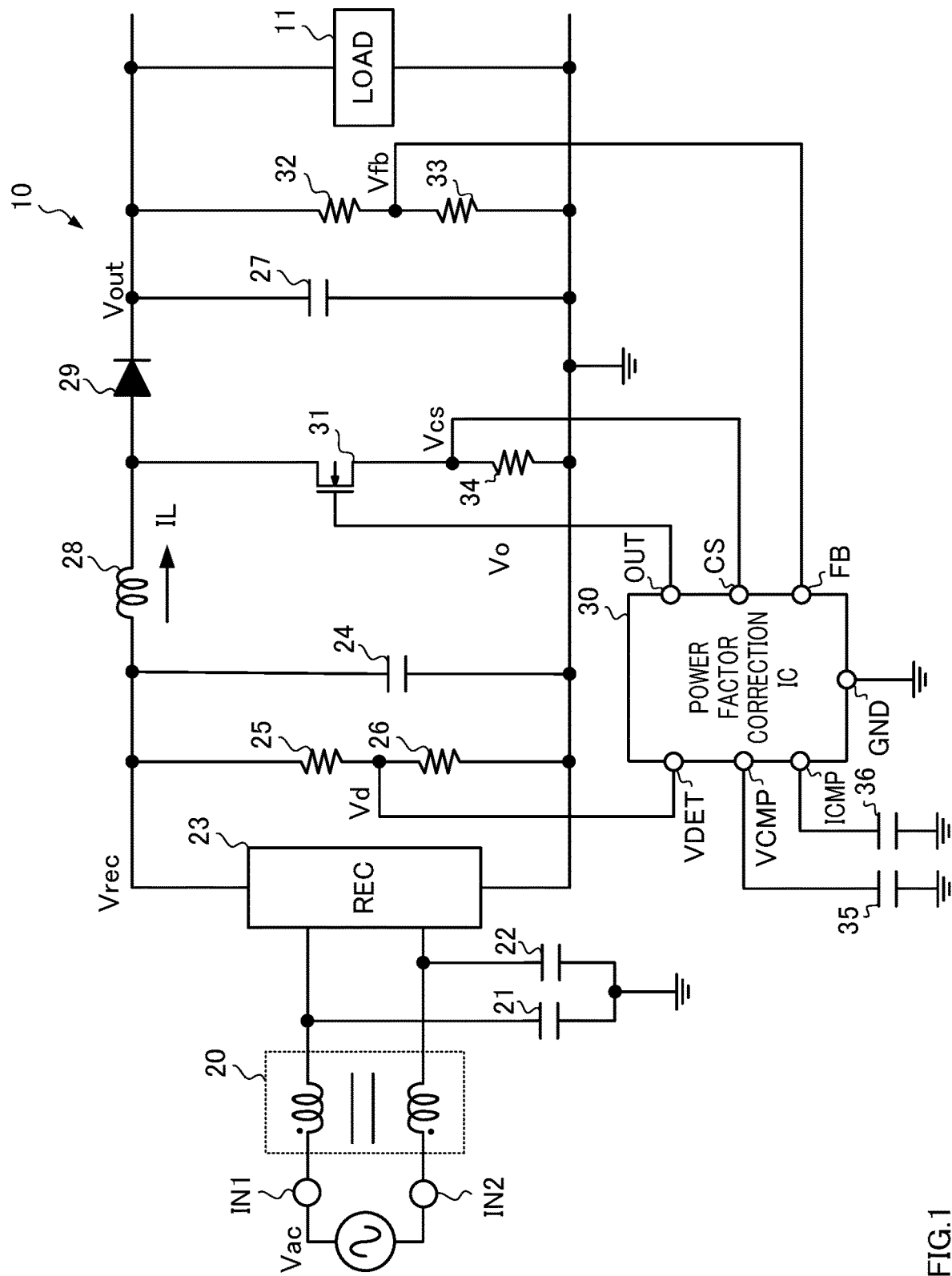
FIG. 1 is a diagram illustrating an example of an AC-DC converter 10.

FIG. 1 is a diagram illustrating a configuration of an AC-DC converter 10 according to an embodiment of the present disclosure. The AC-DC converter 10 is a boost chopper type power supply circuit that generates an output voltage Vout at a target level from an AC voltage Vac of a commercial power supply while improving a power factor. A load 11 is an electronic device that is operated by a DC-DC converter or a DC voltage, for example.

Outline of AC-DC Converter 10

The AC-DC converter 10 includes input terminals IN1 and IN2, a common mode choke coil 20, capacitors 21, 22, 24, 27, 35, and 36, a full-wave rectifier circuit 23, resistors 25, 26, 32, 33 and 34, an inductor 28, a diode 29, a power factor correction IC 30, and an NMOS transistor 31.

The common mode choke coil 20 is a noise filter for reducing common mode noise generated at the input terminals IN1 and IN2 to which the AC voltage Vac is applied. Specifically, the common mode choke coil 20 restrains common mode noise, which is generated on the AC-DC converter 10 side, from being transmitted to the commercial power supply side, for example.

The capacitors 21 and 22 are, for example, elements for reducing a "disturbance voltage" generated between the input terminals IN1 and IN2, and the ground, when the NMOS transistor 31 (described later) are switched. Note that the disturbance voltage will be described later in detail.

The full-wave rectifier circuit 23 full-wave rectifies the applied AC voltage Vac which is a predetermined voltage, and outputs the result as a rectified voltage Vrec to the capacitor 24 and the inductor 28. Note that the AC voltage Vac is a voltage from 100 V to 240 V having a frequency from 50 Hz to 60 Hz, for example.

The capacitor 24 smooths the rectified voltage Vrec, and the resistors 25 and 26 generate a voltage Vd that varies similarly to the rectified voltage Vrec. Note that the resistors 25 and 26 constitute a voltage divider circuit that divides the rectified voltage Vrec. The voltage Vd, which is generated at a node at which the resistors 25 and 26 are connected is applied to a terminal VDET.

The capacitor 27 constitutes a boost chopper circuit together with the inductor 28, the diode 29, and the NMOS transistor 31. Thus, a charging voltage of the capacitor 27 results in a DC output voltage Vout. Note that the output voltage Vout is 400 V, for example.

The power factor correction IC 30 is an integrated circuit that causes the AC-DC converter 10 to operate as a power factor correction circuit and controls switching of the NMOS transistor 31 such that the level of the output voltage Vout becomes the target level (for example, 400 V). Specifically, the power factor correction IC 30 drives the NMOS transistor 31 based on an inductor current IL flowing through the inductor 28 and the output voltage Vout.

The power factor correction IC 30 will be described later in detail, and the power factor correction IC 30 is provided with terminals VDET, VCMP, ICMP, FB, CS, GND, and OUT. Note that the power factor correction IC 30 is also provided with terminals in addition to the foregoing seven terminals, but such terminals are omitted herein for convenience. The power factor correction IC 30 corresponds to a "switching control circuit", and the AC-DC converter 10 corresponds to a "power supply circuit".

The NMOS transistor 31 is a switching device for controlling power to the load 11 of the AC-DC converter 10. It is assumed, in an embodiment of the present disclosure, that the NMOS transistor 31 is a metal oxide semiconductor (MOS) transistor, but it is not limited thereto. When the NMOS transistor 31 is a switching device used for power conversion, a PMOS transistor or a bipolar transistor may be employed, for example.

The resistors 32 and 33 constitute a voltage divider circuit that divides the output voltage Vout, and generates a feedback voltage Vfb that is used when the NMOS transistor 31 is switched. Note that the feedback voltage Vfb generated at a node at which the resistors 32 and 33 are connected is applied to the terminal FB.

The resistor 34 is a resistor for detecting the inductor current IL, and has one end connected with a source of the NMOS transistor 31 and the terminal CS and the other end grounded. In an embodiment of the present disclosure, a voltage Vcs represents a voltage to be input to the terminal CS and indicative of the inductor current IL.

Figure 2:
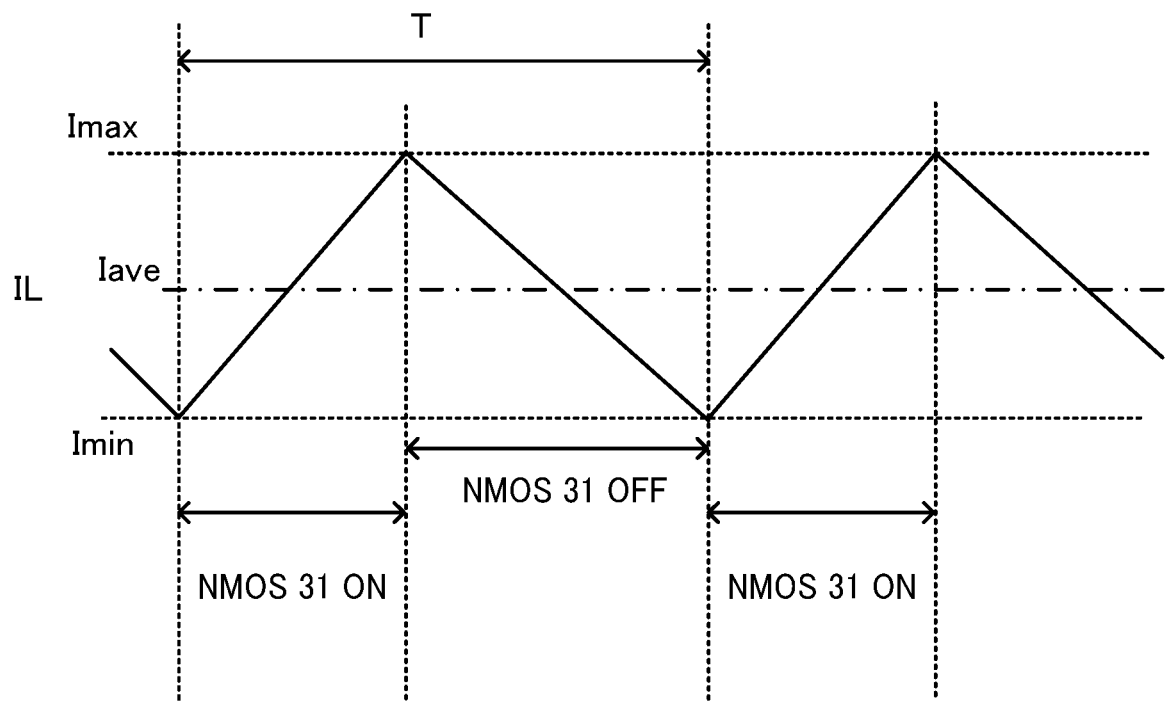
FIG. 2 is a diagram illustrating an inductor current IL.

FIG. 2 is a diagram illustrating the inductor current IL. The inductor current IL increases when the NMOS transistor 31 is ON. The inductor current IL decreases when the NMOS transistor 31 is OFF. Thus, the inductor current IL contains a ripple component corresponding to a switching frequency at which the NMOS transistor 31 is switched. Accordingly, the voltage Vcs detected at the resistor 34 also contains a ripple component similar to the ripple component of the inductor current IL.

Note that, hereinafter, in an embodiment of the present disclosure, the value of the inductor current IL per a switching period T of the NMOS transistor 31 is referred to as an "average value Iave". In the switching period T, the ratio of a difference between the maximum value Imax and the minimum value Imin of the inductor current IL to the average value Iave is referred to as a "ripple rate". Thus, the ripple rate of the inductor current IL is given by Equation (1) below.

$$\text{Ripple rate}=((I\text{max}-I\text{min})/I\text{ave})\times 100 \tag{1}$$

The capacitors 35 and 36 are elements for phase compensation of the feedback controlled power factor correction IC 30. The capacitor 35 is provided between the terminal VCMP and the ground, and the capacitor 36 is provided between the terminal ICMP and the ground. The terminal GND is a terminal connected with a housing, not illustrated, serving as a ground.

Disturbance Voltage

Figure 3:
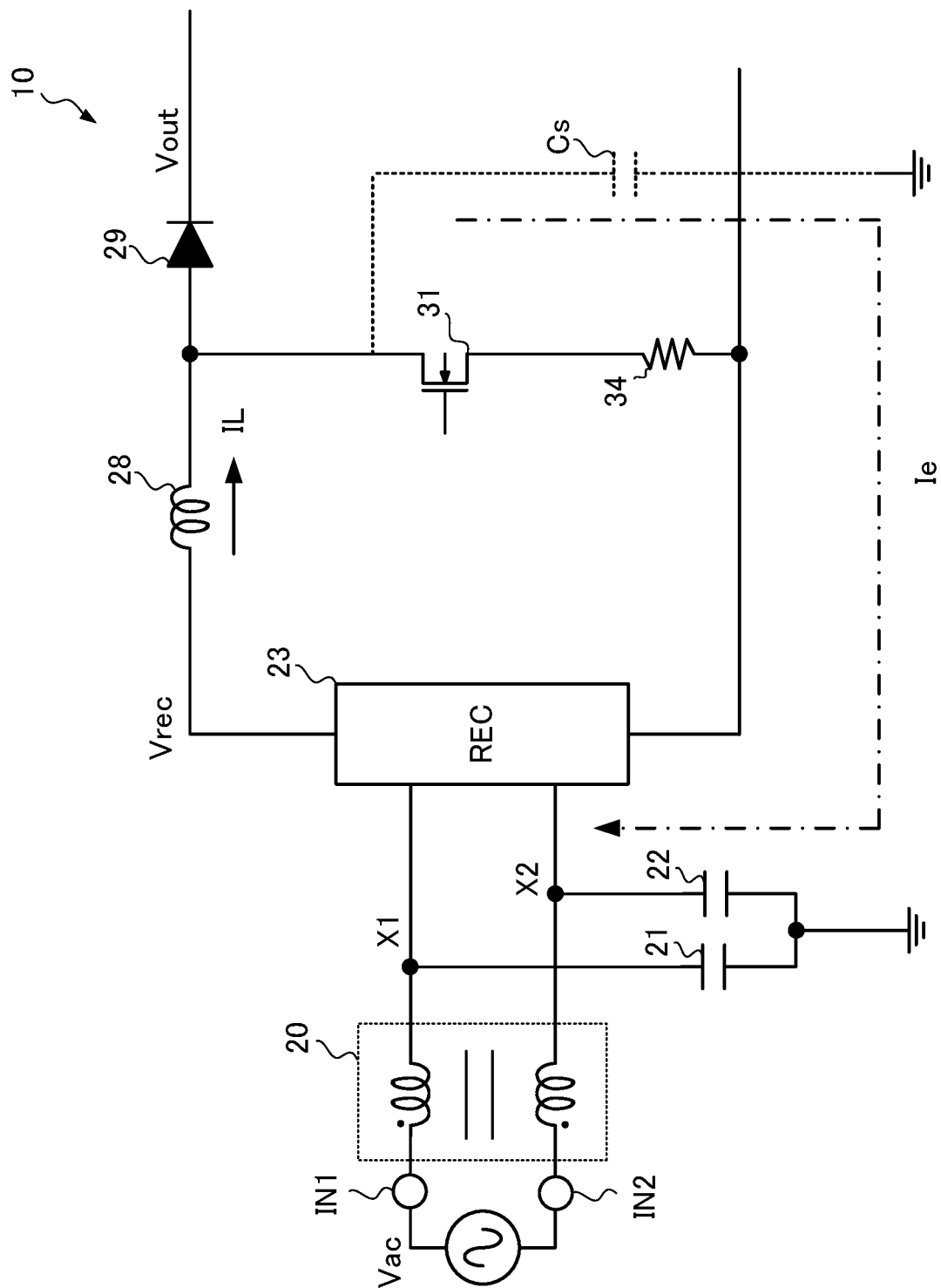
FIG. 3 is a diagram illustrating a path of a leakage current Ie.

FIG. 3 is a diagram illustrating the disturbance voltage generated between the input terminals IN1 and IN2, and the ground. Note that FIG. 3 only partially illustrates the AC-DC converter 10 for convenience.

Here, the NMOS transistor 31 is a switching device for power conversion, and has a large size. Thus, a parasitic capacitance Cs is generated between the drain of the NMOS transistor 31 and the housing serving as the ground.

Thus, when the NMOS transistor 31 is switched and a voltage of the drain of the NMOS transistor 31 varies, the leakage current Ie flows from the parasitic capacitance Cs to the capacitors 21 and 22 via the ground.

As a result, a voltage according to the leakage current Ie and the capacitance values of the parasitic capacitance Cs and the capacitors 21 and 22, is generated between two nodes X1 and X2, and the ground. Note that, here, a node at which the common mode choke coil 20 and the capacitor 21 are connected is referred to as the node X1, and a node at which the common mode choke coil 20 and the capacitor 22 are connected is referred to as the node X2.

The common mode choke coil 20 according to an embodiment of the present disclosure reduces common mode noise generated at the nodes X1 and X2, but cannot remove the common mode noise at the nodes X1 and X2 completely. As a result, a disturbance voltage corresponding to the voltage at the nodes X1 and X2 is generated between the input terminals IN1 and IN2, and the ground.

Incidentally, the disturbance voltage between the input terminals IN1 and IN2, and the ground is generated, based on the leakage current Ie when the NMOS transistor 31 is switched. Thus, the level of the disturbance voltage rises at frequencies indicative of a fundamental wave and a higher harmonic wave of the switching frequency of the NMOS transistor 31.

In view of this, the power factor correction IC 30 in an embodiment of the present disclosure modulates the switching frequency of the NMOS transistor 31 to reduce the level of the disturbance voltage at the input terminals IN1 and IN2.

Example of Power Factor Correction IC 30

Figure 4:
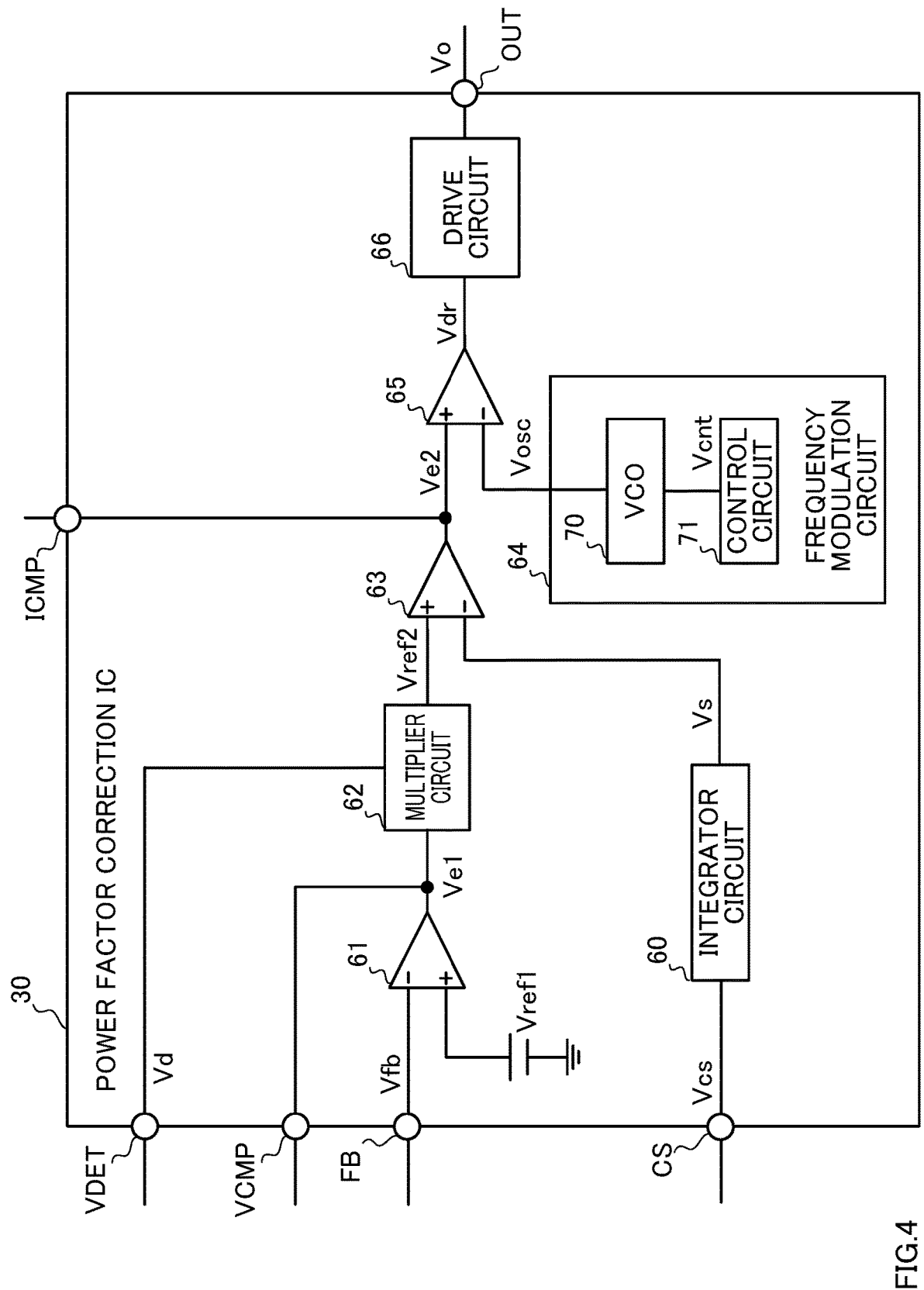
FIG. 4 is a diagram illustrating an example of a power factor correction IC 30.

FIG. 4 is a diagram illustrating an example of the power factor correction IC 30. The power factor correction IC 30 is a control circuit for current mode control that controls the average value Iave of the inductor current IL such that the level of the output voltage Vout reaches the target level. Note that, in FIG. 4, the terminal GND is omitted, and the terminals FB, CS, and ICMP are illustrated at positions different from the positions in FIG. 1, for convenience.

The power factor correction IC 30 includes an integrator circuit 60, error amplifier circuits 61 and 63, a multiplier circuit 62, a frequency modulation circuit 64, a comparator circuit 65, and a drive circuit 66.

The integrator circuit 60 integrates the voltage Vcs to remove the ripple component contained in the voltage Vcs and outputs the integration result as a voltage Vs. As a result, the integrator circuit 60 outputs the inductor current IL with the ripple component removed, in other words, the voltage Vs indicative of the average value Iave of the inductor current IL.

The error amplifier circuit 61 is a transconductance amplifier that generates a voltage Ve1 corresponding to an error between the feedback voltage Vfb corresponding to the level of the output voltage Vout and a reference voltage Vref1 corresponding to the target level. The error amplifier circuit 61 charges and discharges the capacitor 35 of the terminal VCMP according to the error between the feedback voltage Vfb applied to the terminal FB and the reference voltage Vref1. Thus, the voltage Ve1 corresponding to the error between the feedback voltage Vfb and the reference voltage Vref is generated at the capacitor 35.

Note that the feedback voltage Vfb is applied to the inverting input terminal of the error amplifier circuit 61, the reference voltage Vref1 is applied to the non-inverting input terminal. Thus, when the feedback voltage Vfb rises, the voltage Ve1 drops, and when the feedback voltage Vfb drops, the voltage Ve1 rises.

The multiplier circuit 62 generates a reference voltage Vref2 indicative of a reference current Ire f serving as a target of the average value Iave of the inductor current IL. Specifically, the multiplier circuit 62 multiplies the voltage Vd, which varies similarly to the rectified voltage Vrec, with the voltage Ve1, and outputs the multiplication result as the reference voltage Vref2. Here, when the level of the output voltage Vout is a constant value, the voltage Ve1 is also a constant value. As a result, the reference voltage Vref2 varies similarly to the voltage Vd.

Figure 5:
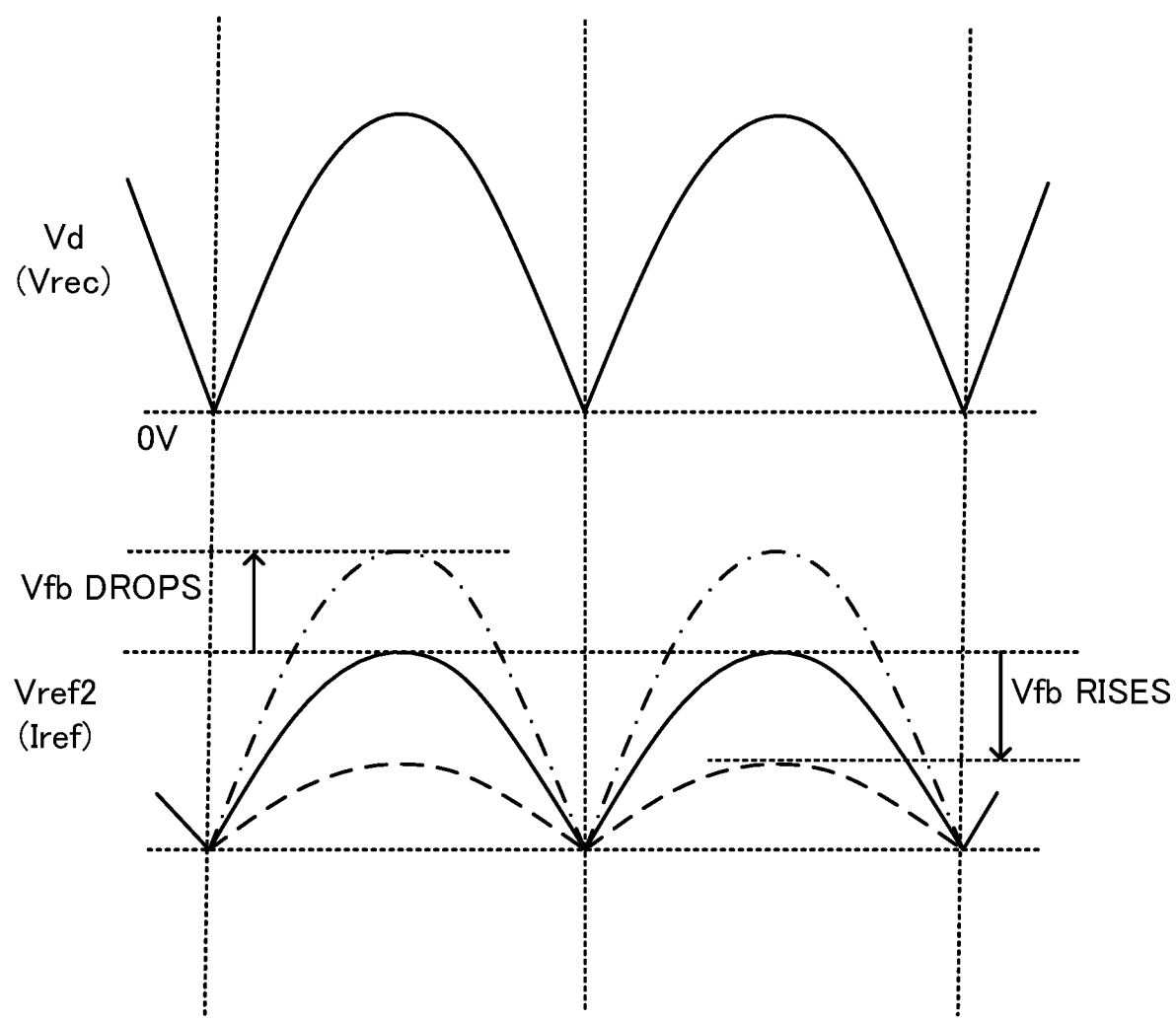
FIG. 5 is a diagram illustrating a reference voltage Vref2.

Thus, for example, as illustrated in FIG. 5, when the feedback voltage Vfb drops and the voltage Ve1 rises accordingly, the reference voltage Vref2 rises. In contrast, when the feedback voltage Vfb rises and the voltage Ve1 drops accordingly, the reference voltage Vref2 drops. As such, when the feedback voltage Vfb rises, the reference current Iref serving as the target of the average value Iave of the inductor current IL decreases, and when the feedback voltage Vfb drops, the reference current Iref increases.

The error amplifier circuit 63 is a transconductance amplifier that generates a voltage Ve2 corresponding to an error between the voltage Vs corresponding to the average value Iave of the inductor current IL and the reference voltage Vref2 indicative of the target of the average value Iave. The error amplifier circuit 63 charges and discharges the capacitor 36 of the terminal ICMP according to the error between the voltage Vs and the reference voltage Vref2. Thus, the voltage Ve2 corresponding to the error between the voltage Vs and the reference voltage Vref2 is generated at the capacitor 36.

Note that the voltage Vs is applied to the inverting input terminal of the error amplifier circuit 63, and the reference voltage Vref2 is applied to the non-inverting input terminal thereof. Thus, when the reference voltage Vref2 rises, the voltage Ve2 rises, and when the reference voltage Vref2 drops, the voltage Ve2 drops.

The frequency modulation circuit 64 modulates a frequency of an oscillator signal Vosc for determining the switching frequency, and outputs the modulated oscillator signal Vosc. The frequency modulation circuit 64 includes a voltage-controlled oscillator circuit 70 and a control circuit 71.

The voltage-controlled oscillator circuit (voltage controlled oscillator, VCO) 70 outputs the oscillator signal Vosc of a ramp wave having a frequency corresponding to an input voltage. Specifically, the voltage-controlled oscillator circuit 70 outputs the oscillator signal Vosc having a frequency that rises with a rise in the level of the input voltage.

Figure 6:
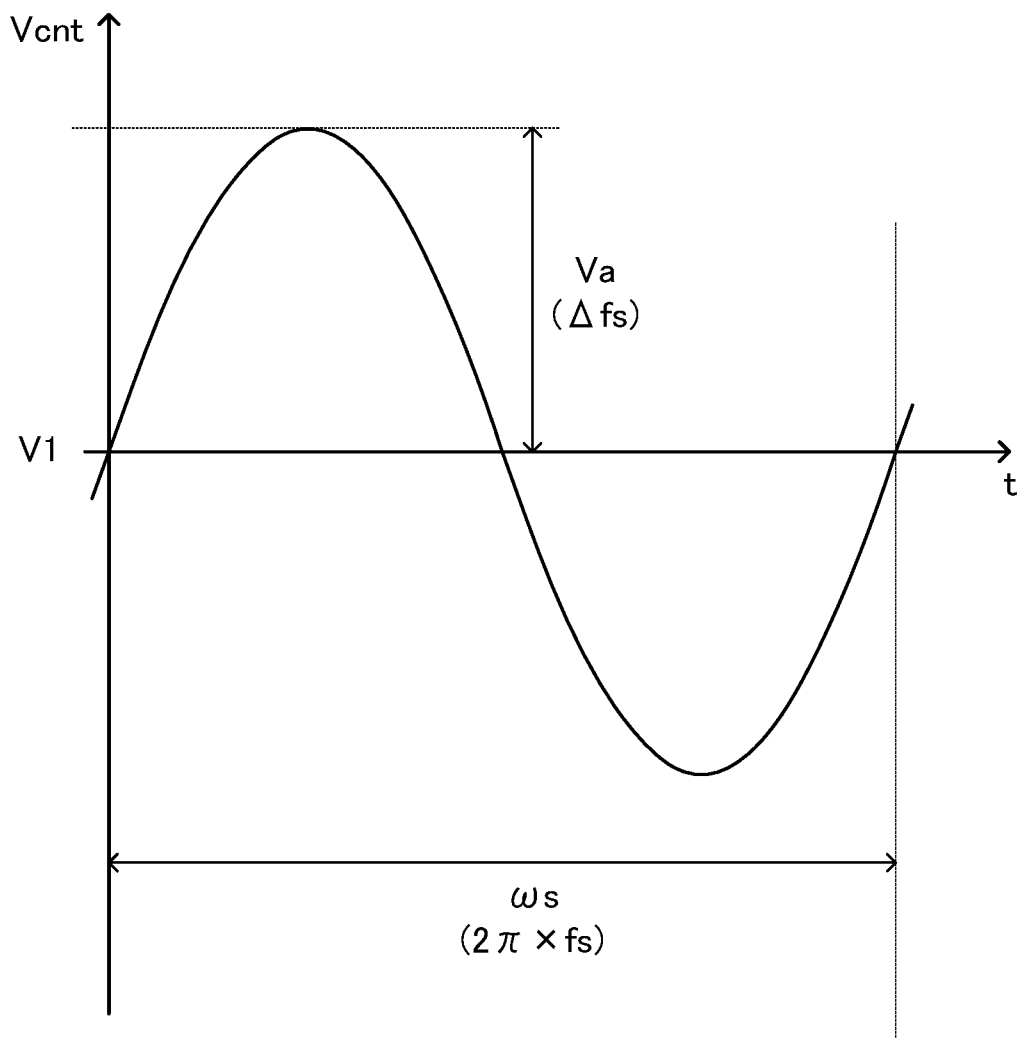
FIG. 6 is a diagram illustrating a control voltage Vcnt.

The control circuit 71 outputs a control voltage Vcnt for modulating the frequency of the oscillator signal Vosc, to the voltage-controlled oscillator circuit 70. Specifically, as illustrated in FIG. 6, the control circuit 71 outputs the control voltage Vcnt that varies sinusoidally around a voltage V1 (>0).

Here, the control voltage Vcnt is given by Equation (2) below.

$$Vcnt = V1 + Va \times \sin \omega_s t \qquad (2)$$

where "Va" is an amplitude of the control voltage Vcnt, and "$\omega_s$" is an angular velocity. In this case, a frequency fs of the control voltage Vcnt is "$\omega_s/2\pi$".

Figure 7:
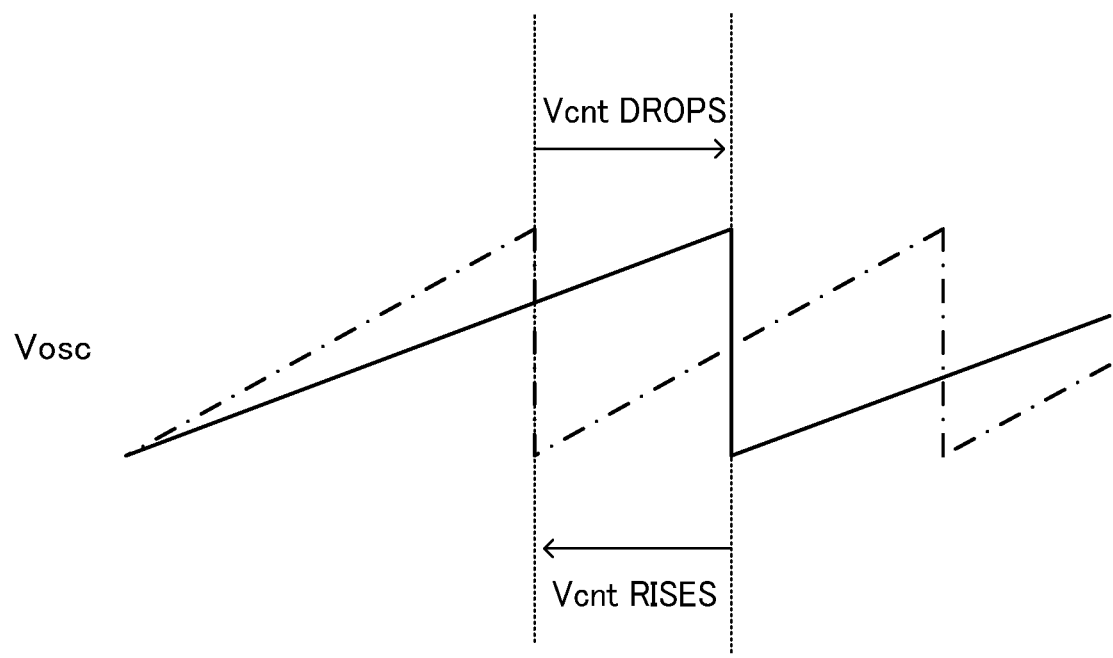
FIG. 7 is a diagram illustrating an oscillator signal Vosc.

FIG. 7 is a diagram illustrating an example of a waveform of the oscillator signal Vosc when the control voltage Vcnt varies. When the level of the control voltage Vcnt rises, the frequency of the oscillator signal Vosc increases and the waveform shifts from the solid line to the dashed-dotted line. Further, the level of the control voltage Vcnt satisfies "V1+Va", the frequency of the oscillator signal Vosc reaches the maximum.

In contrast, the level of the control voltage Vcnt drops, the frequency of the oscillator signal Vosc decreases and the waveform shifts from the dashed-dotted line to the solid line. Further, the level of the control voltage Vcnt satisfies "V1−Va", the frequency of the oscillator signal Vosc reaches the minimum.

Hereinafter, in an embodiment of the present disclosure, when the control voltage Vcnt varies from the voltage V1 by the amplitude "Va", such a deviation of the frequency of the oscillator signal Vosc is referred to as a "maximum frequency deviation Δfs". Further, when the frequency of the oscillator signal Vosc is modulated at the frequency fs and the sinusoidal control voltage Vcnt of the maximum frequency deviation Δfs, a "modulation index m" is given by Equation (3) below.

$$M = \Delta fs/fs \qquad (3)$$

Figure 8:
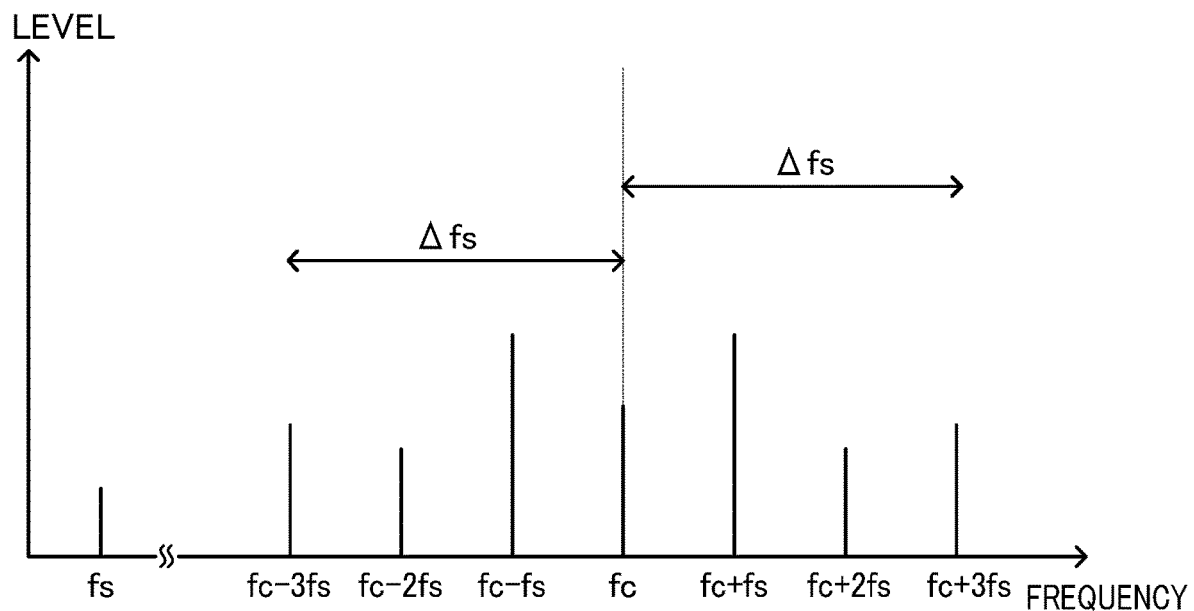
FIG. 8 is a diagram illustrating a frequency component of a frequency-modulated oscillator signal Vosc.

FIG. 8 is a diagram illustrating an example of a frequency component of the modulated oscillator signal Vosc when the frequency of the oscillator signal Vosc is modulated at the frequency fs and the sinusoidal control voltage Vcnt of the maximum frequency deviation Δfs. Note that, in FIG. 8, a "frequency fc" is the frequency of the oscillator signal Vosc before modulation (for example, a frequency when Vcnt=V1 is satisfied), and the maximum frequency deviation Δfs is three times as large as the frequency fs (Δfs=3×fs).

Figure 9:
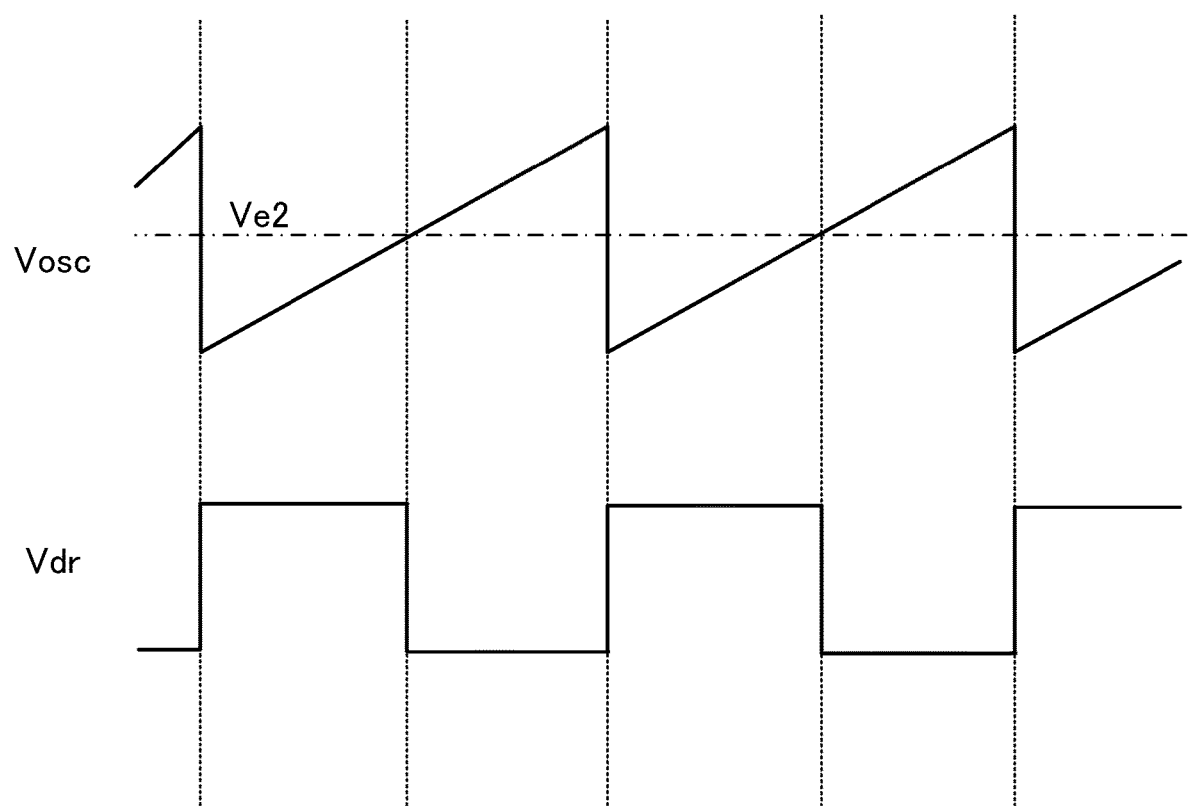
FIG. 9 is a diagram illustrating a drive signal Vdr.

The comparator circuit 65 compares the magnitude between the voltage Ve2 and the oscillator signal Vosc, and outputs a drive signal Vdr as a result of such comparison. As illustrated in FIG. 9, the comparator circuit 65 outputs the drive signal Vdr at a high level (hereinafter, referred to as high or high level) when the level of the oscillator signal Vosc is lower than the level of the voltage Ve2. In contrast, the comparator circuit 65 outputs the drive signal Vdr at a low level (hereinafter, referred to as low or low level) when the level of the oscillator signal Vosc is higher than the level of the voltage Ve2.

The drive circuit 66 drives the NMOS transistor 31 having a large gate capacitance and the like, with a signal Vo at the same logic level as the logic level of the input drive signal Vdr. Specifically, the drive circuit 66 turns on the NMOS transistor 31 in response to the high drive signal Vdr, and turns off the NMOS transistor 31 in response to the low drive signal Vdr.

Here, when the reference voltage Vref2 indicative of the target of the average value Iave is higher than the voltage Vs corresponding to the average value Iave of the inductor current IL, the voltage Ve2 rises. As a result, the duty ratio of the high drive signal Vdr increases, and hence the average value Iave of the inductor current IL increases. In contrast, when the reference voltage Vref2 is lower than the voltage Vs indicative of the average value Iave of the inductor current IL, the voltage Ve2 drops. As a result, the duty ratio of the high drive signal Vdr decreases, and hence the average value Iave of the inductor current IL decreases.

Figure 10:
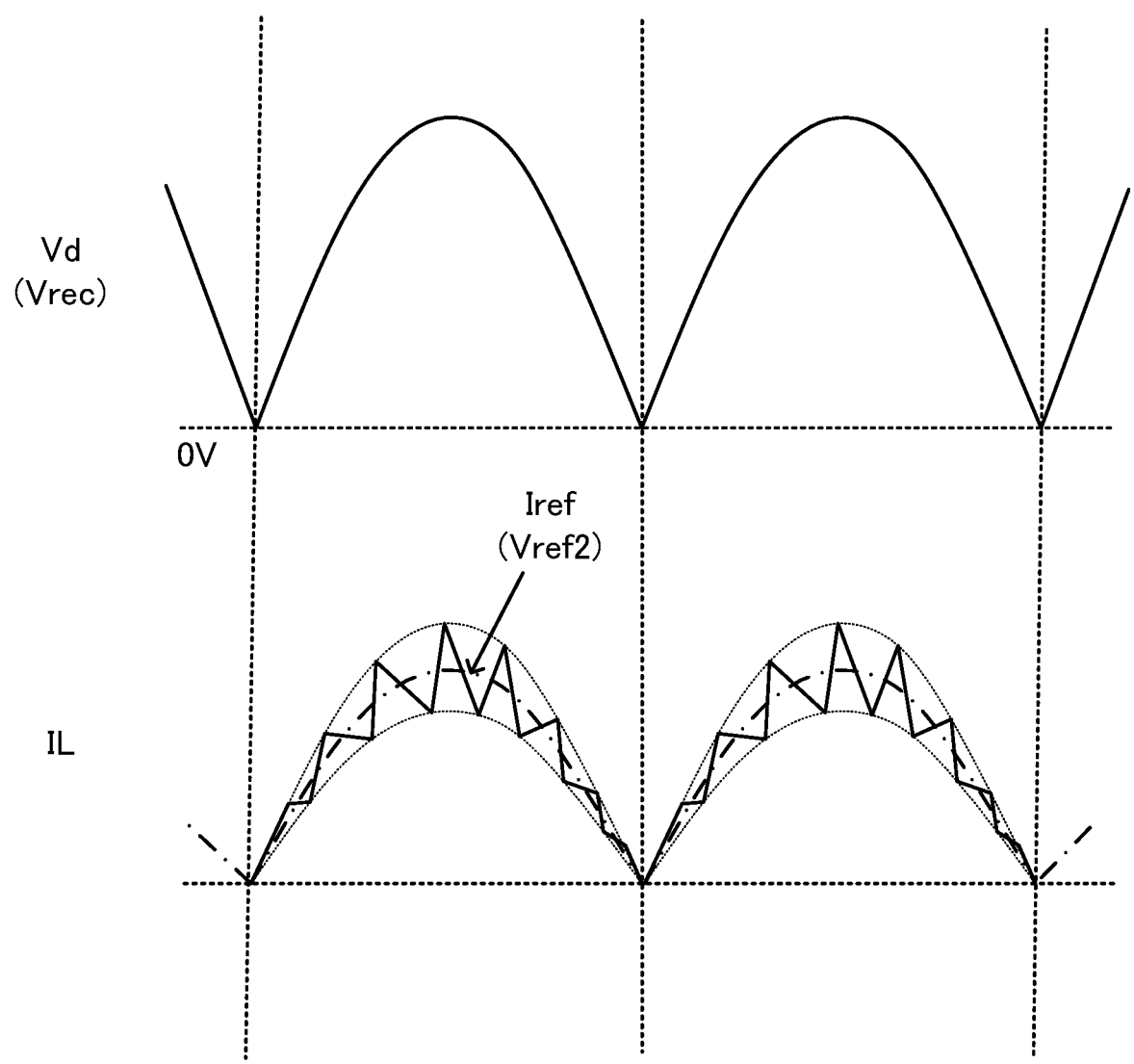
FIG. 10 is a diagram illustrating a relationship between a voltage Vd and an inductor current IL.

As such, in the AC-DC converter 10 in an embodiment of the present disclosure, the inductor current IL is feedback controlled such that the average value Iave of the inductor current IL reaches the reference current Iref. In an embodiment of the present disclosure, as illustrated in FIG. 5, the waveform of the reference current Iref varies similarly to the voltage Vd obtained by dividing the rectified voltage Vrec. As a result, the inductor current IL varies similarly to the rectified voltage Vrec, as illustrated in FIG. 10, thereby improving a power factor.

Note that the switching frequency in an embodiment of the present disclosure is, for example, 100 kHz or higher, which is sufficiently higher than the frequency of the AC voltage Vac (for example, 50 Hz). Thus, FIG. 10 illustrates the inductor current IL such that variation in the inductor current IL can be understood, for convenience.

In the AC-DC converter 10 according to an embodiment of the present disclosure, when the output voltage Vout drops below the target level, and the feedback voltage Vfb drops below the reference voltage Vref1, the voltage Ve1 rises. As a result, as illustrated in FIG. 5, the reference voltage Vref2 rises, and hence the output voltage Vout rises accordingly. In contrast, when the output voltage Vout rises above the target level, and the feedback voltage Vfb rises above the reference voltage Vref1, the voltage Ve1 drops. As a result, the reference voltage Vref2 drops, and hence the output voltage Vout drops accordingly.

As such, in the AC-DC converter 10 according to an embodiment of the present disclosure, the output voltage Vout is feedback controlled, and hence the output voltage Vout at the target level is generated. Note that the error amplifier circuit 61 corresponds to a "first error voltage output circuit" that outputs the voltage Ve1 (first error voltage), and the error amplifier circuit 63 corresponds to a "second error voltage output circuit" that outputs the voltage Ve2 (second error voltage).

Measurement of Disturbance Voltage

Figure 11:
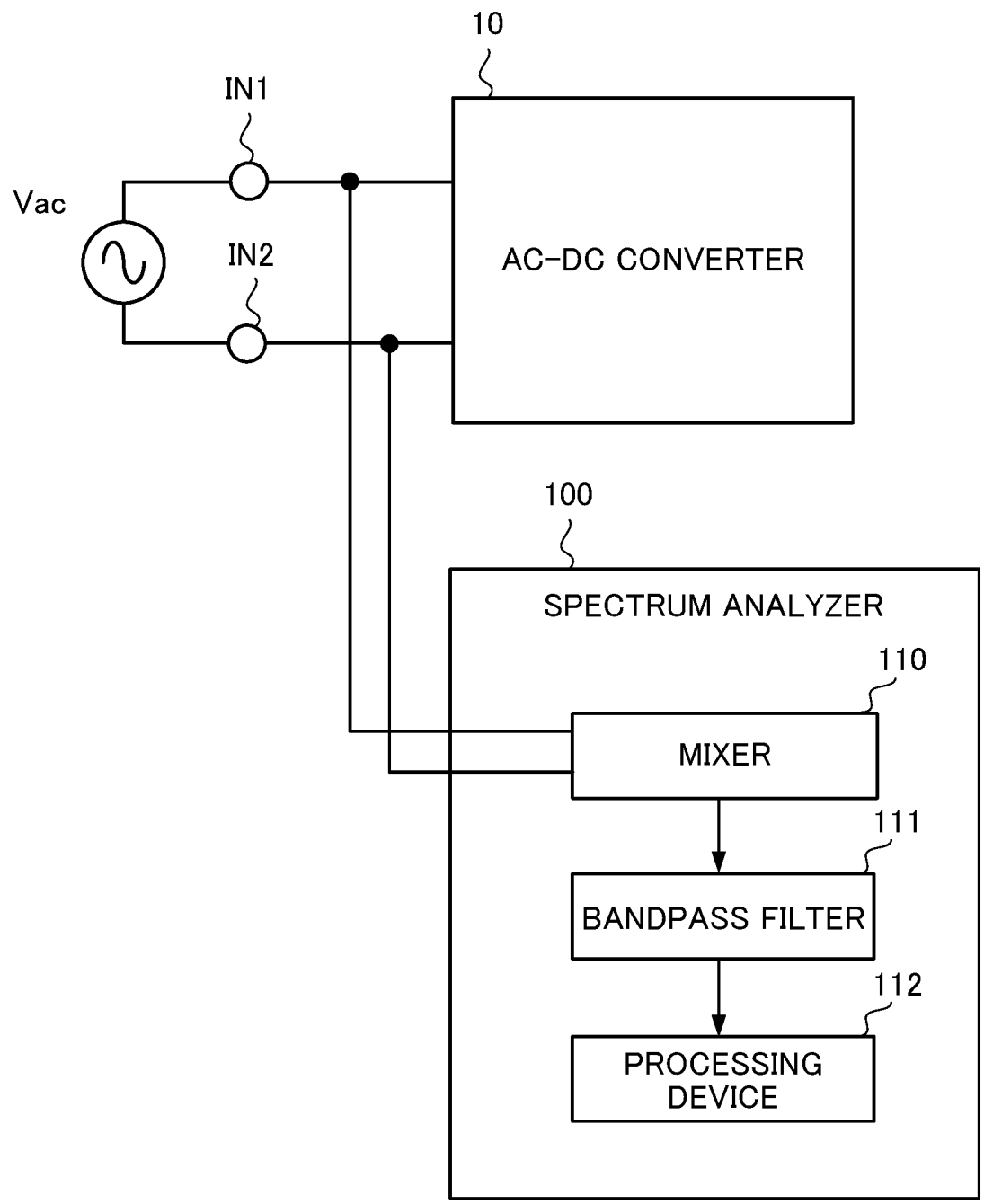
FIG. 11 is a diagram illustrating a spectrum analyzer 100.

FIG. 11 is a diagram illustrating a spectrum analyzer 100 that measures the disturbance voltage generated between the input terminals IN1 and IN2, and the ground, when the AC-DC converter 10 is operated.

The spectrum analyzer 100 measures a frequency component of an input signal, and includes, for example, a mixer 110, a bandpass filter 111, and a processing device 112 as main constituent elements.

The mixer 110 converts the frequency of the input signal using the input signal and a signal from a local oscillator (not illustrated).

The bandpass filter 111 allows only a signal in a desired band to pass therethrough among frequency-converted input signals. The processing device 112 analyzes a spectrum of the signal having passed through the bandpass filter 111.

Here, in an embodiment of the present disclosure, a frequency component of the disturbance voltage is measured based on CISPR 16-1 standard (hereinafter, simply referred to as CISPR standard) defined by the International Special Committee on Radio Interference. Note that, for example, CISPR standard specifies that the measurement frequency band is "from 0.15 MHz to 30 MHz" and that a resolution bandwidth (or also referred to as a reference bandwidth) of the bandpass filter used for measurement is "9 kHz".

Figure 12:
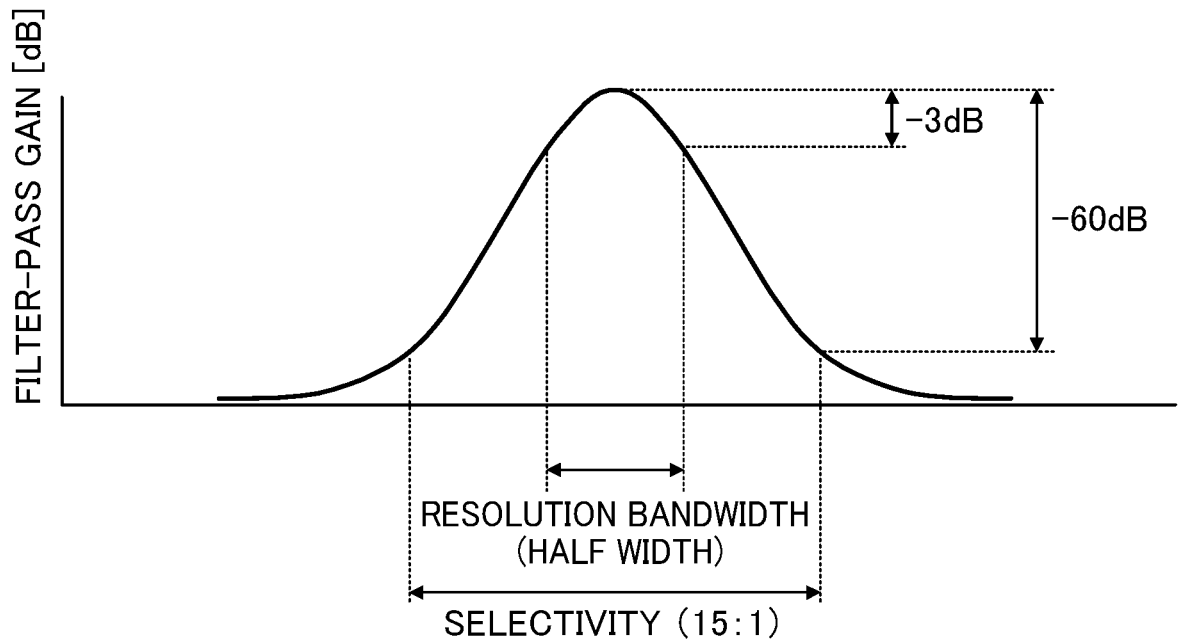
FIG. 12 is a diagram illustrating a property of a bandpass filter 111.

FIG. 12 is a diagram illustrating a property of the bandpass filter 111 used for measuring the disturbance voltage. The bandpass filter 111 has a resolution bandwidth of "9 kHz" and selectivity of "15:1". Here, the "resolution bandwidth" represents a bandwidth in which a gain is attenuated by −3 dB from a gain of the center frequency of the bandpass filter 111, in other words, a "half width". The "selectivity" is defined by a ratio of a bandwidth in which a gain is attenuated by −60 dB and a bandwidth in which a gain is attenuated by −3 dB (=60 dB BW/3 dB BW) in the filter property.

When the bandpass filter 111 described as such is used to measure the frequency component of the disturbance voltage, it is preferable, in CISPR standard, to reduce a noise component contained in a band of "9 kHz", which is a "half width".

Further, as described with FIG. 8, when the frequency fc of the oscillator signal Vosc is modulated with the frequency fs of the sinusoidal control voltage Vcnt, the frequency of the modulated oscillator signal Vosc is, for example, fc±fs, fc±2 fs, or fc±3 fs. Accordingly, when the frequency fs is set higher than "4.5 kHz", which is a half of "9 kHz" which is the "half width" of the bandpass filter 111, it is possible to efficiently reduce the noise contained in the "half width" of the bandpass filter 111.

Thus, in an embodiment of the present disclosure, the frequency fs of the control voltage Vcnt is set to "5 kHz", which is higher than the frequency ("4.5 kHz") which is a half of the "half width". Note that the frequency fs of "5 kHz" corresponds to a "predetermined frequency".

Figure 13:
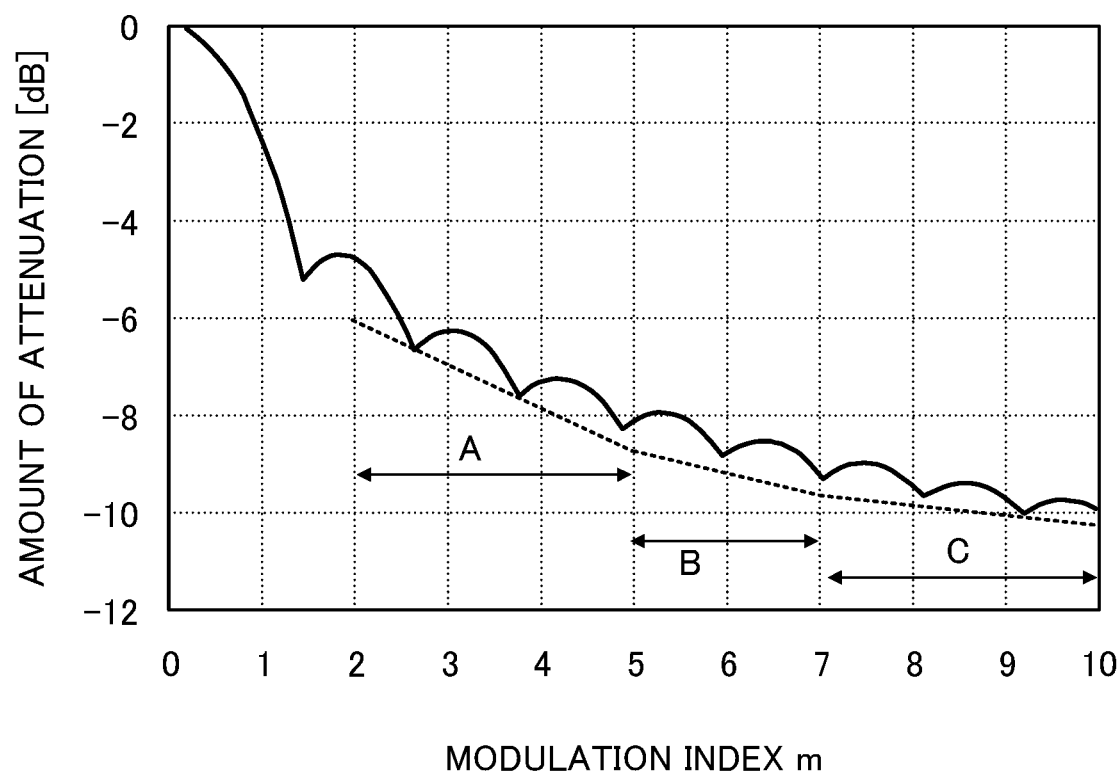
FIG. 13 is a diagram illustrating a relationship between a modulation index m and an amount of attenuation by the bandpass filter 111.

FIG. 13 is a diagram illustrating a relationship between the modulation index m (=Δfs/fs), which is derived from a theoretical formula, and an amount of attenuation by the bandpass filter 111.

FIG. 13 is a diagram illustrating an amount of attenuation of a spectrum of the oscillator signal Vosc before modulation using a logarithm, when the spectrum of the oscillator signal Vosc before modulation is set to 0 dB and the modulation index m (=Δfs/fs) is varied. Specifically, FIG. 13 illustrates a result obtained by deriving peak values of the spread spectra using a Bessel function in Equation (4) given below.

$$I_n(m) = \frac{1}{2\pi} \int_0^{2\pi} \cos(n\theta - m\sin(\theta)) \, d\theta \qquad (4)$$

Note that, in Equation (4), "n" is a value indicative of a fundamental wave or a higher harmonic wave of the oscillator signal Vosc. When "n"=1, for example, a component of the frequency fc in FIG. 8 is calculated. When "n"=2, for example, components of frequencies "fc+fs" and "fc−fs" in FIG. 8 are calculated.

As illustrated in FIG. 13, when the modulation index m increases, the amount of attenuation can increase. For example, assuming that the modulation index m is "2", the amount of attenuation of the spectrum of the oscillator signal Vosc before modulation can be increased larger than 3 dB, as compared to the case in which modulation is not performed.

For example, in a range from "2" to "10" of the modulation index m, the amount of attenuation greatly varies largely in a "range A" from "2" to "5", and the amount of attenuation varies in a slightly gentle manner in a "range B" from "5" to "7". In a "range C" from "7" to "10" of the modulation index m, the amount of attenuation does not vary so much even when the modulation index m increases.

Incidentally, in the predetermined frequency fs, when the modulation index m is increased, the maximum frequency deviation Δfs of the oscillator signal Vosc increases. When the maximum frequency deviation Δfs increases, the minimum switching frequency (fc−Δfs) of the NMOS transistor 31 greatly decreases. As a result, an ON time period and an OFF time period of the NMOS transistor 31 becomes longer, and hence the ripple rate of the inductor current IL becomes larger (for example, see FIG. 2).

In view of this, in an embodiment of the present disclosure, the modulation index m is set to "6" in order to achieve an effect of reduction in the noise while restraining increase in the ripple rate. Thus, the maximum frequency deviation Δfs is "30 kHz", and the ripple rate is smaller than a predetermined value (for example, 20%), for example.

Hereinafter, in an embodiment of the present disclosure, it is assumed that the frequency fc of the oscillator signal Vosc before modulation is "140 kHz", for example.

Figure 14:
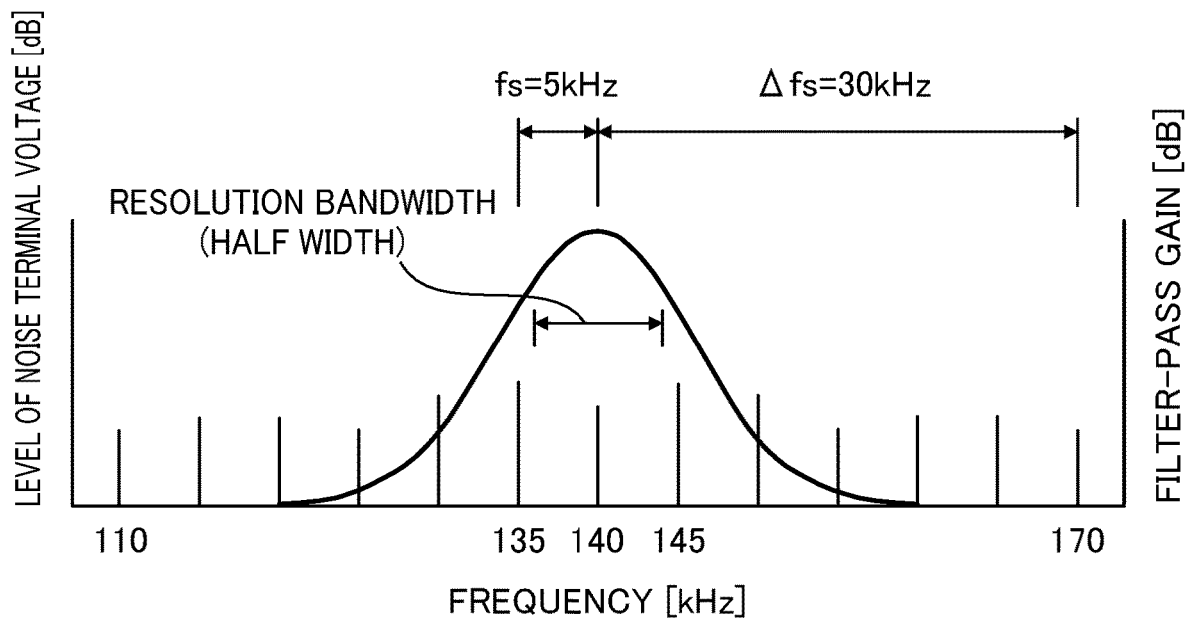
FIG. 14 is a diagram illustrating an example of a spectrum when frequency modulation has been performed.

FIG. 14 is a diagram illustrating a relationship between a frequency component of the frequency-modulated oscillator signal Vosc and the property of the bandpass filter 111. Note that, in FIG. 14, the center frequency of the bandpass filter 111 is equal to "140 kHz", which is the frequency fc of the oscillator signal Vosc before modulation.

When the frequency modulation circuit 64 modulates the frequency of the oscillator signal Vosc with a frequency fs of "5 kHz" and a modulation index m of "6", twelve spectra in total appear every 5 kHz in the range of ±"30 kHz" from "140 kHz".

In the AC-DC converter 10, the frequency of the modulated oscillator signal Vosc corresponds to the switching frequency of the NMOS transistor 31. Thus, the spectrum of the disturbance voltage is equivalent to the spectrum of the oscillator signal Vosc. As a result, in an embodiment of the present disclosure, it is possible to reduce the spectrum included in the resolution bandwidth of the bandpass filter 111 around the frequency fc.

Figure 15:
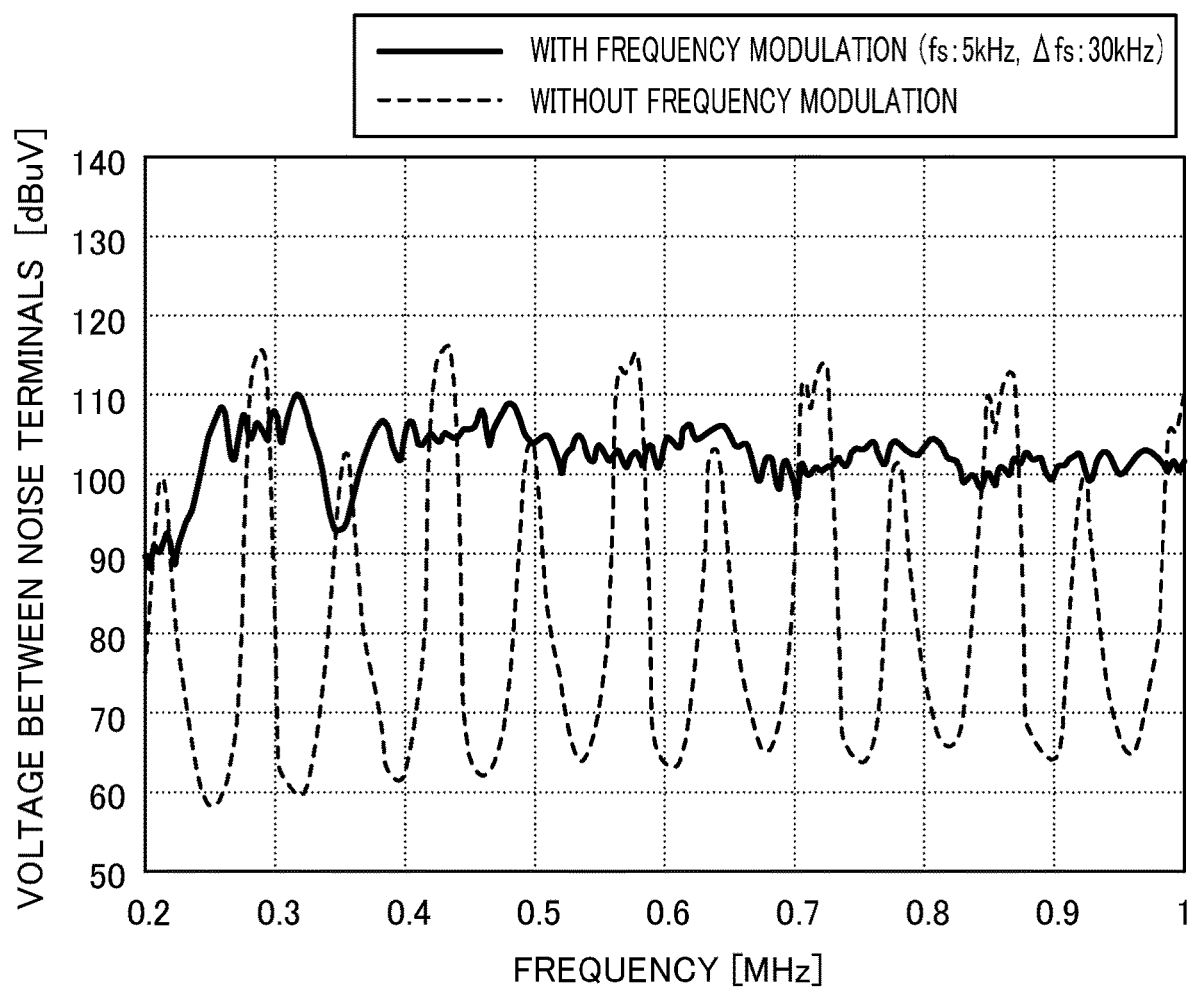
FIG. 15 is a diagram illustrating an example of measurement results of a disturbance voltage.

FIG. 15 is a diagram illustrating an example of measurement results obtained by the spectrum analyzer 100. When the frequency fc of the oscillator signal Vosc is not modulated, a large disturbance voltage is generated particularly in a higher harmonic wave (for example, 280 kHz, 420 kHz, and/or the like) of the frequency fc (="140 kHz").

Meanwhile, when the frequency fc of the oscillator signal Vosc is modulated with the frequency fs of "5 kHz" and "the modulation index m=6", the level of the disturbance voltage is reduced particularly in a higher harmonic wave of the frequency fc (="140 kHz"). As a result, in an embodiment of the present disclosure, it is possible to reduce the level of the disturbance voltage between the input terminals IN1 and IN2, and the ground.

SUMMARY

The AC-DC converter 10 according to an embodiment of the present disclosure has been described hereinabove. In an embodiment of the present disclosure, the frequency fc of the oscillator signal Vosc is modulated with the frequency fs of "5 kHz" which is higher than a half of the half width of the bandpass filter 111, but it is not limited thereto. For example, modulation may be performed with the frequency fs higher than "2.25 kHz" which is a quarter of the half width of the bandpass filter 111. In such a case, it is possible to reduce the level of the disturbance voltage included in the resolution bandwidth of the bandpass filter 111, as compared to the case in which the oscillator signal Vosc is not modulated.

In addition, when the frequency fc of the oscillator signal Vosc is modulated with the frequency fs of "5 kHz" which is higher than a half of the half width of the bandpass filter 111, the spectrum of the disturbance voltage can be transferred to the outside the resolution bandwidth of the bandpass filter 111. As a result, it is possible to greatly reduce the level of the disturbance voltage included in the resolution bandwidth of the bandpass filter 111.

In addition, for example, the maximum frequency deviation Δfs of the frequency fc of the oscillator signal Vosc is set larger than the half width of the bandpass filter 111, thereby being able to greatly reduce the level of the disturbance voltage included in the resolution bandwidth of the bandpass filter 111.

In addition, in an embodiment of the present disclosure, when the frequency of the oscillator signal Vosc is modulated, the modulation index m is set to "6" which is larger than "5", for example. This can greatly reduce the level of the disturbance voltage included in the resolution bandwidth of the bandpass filter 111.

In addition, the frequency of the oscillator signal Vosc can be modulated by controlling the voltage-controlled oscillator circuit 70.

In addition, when the NMOS transistor 31, which is provided between the line on the power supply side connected with the inductor 28 and the diode 29 and the line on the ground side, is switched, the leakage current Ie flows to the ground via the parasitic capacitance Cs. Thus, the switching frequency of a circuit (for example, a DC-DC converter or inverter) including a switching device for power conversion that is similar to the NMOS transistor 31 is modulated as in an embodiment of the present disclosure, thereby being able to reduce the noise from the circuit including the switching device.

In addition, the power factor correction IC 30 in an embodiment of the present disclosure is used in the AC-DC converter 10, thereby being able to reduce the level of the disturbance voltage at the input terminals IN1 and IN2. As a result, an electronic device (not illustrated) connected with the input terminals IN1 and IN2 can be prevented from being affected by the noise from the AC-DC converter 10.

In addition, the power factor correction IC 30 can improve a power factor while reducing the disturbance voltage at the input terminals IN1 and IN2.

In addition, in an embodiment of the present disclosure, the modulation index m is set to "6" which is a value that enables achievement of an effect of attenuation of the noise while preventing increase in the ripple rate of the inductor current IL. Thus, for example, the ripple rate of the inductor current IL can be reduced below a predetermined value (for example, 20%). Note that the modulation index m may be set to be smaller than "6" to further reduce the ripple rate of the inductor current IL.

Note that, in an embodiment of the present disclosure, the disturbance voltage is measured based on the CISPR standard, but may be measured based on other standards (for example, the standard of the Federal Communications Commission (FCC)). In such a case, the frequency fs is determined based on a half width of a bandpass filter in accordance with such other standards.

Embodiment (s) of the present disclosure described above is/are simply for facilitating the understanding of the present disclosure and is/are not in any way to be construed as limiting the present disclosure. The present disclosure may variously be changed or altered without departing from its gist and encompass equivalents thereof.

What is claimed is:

1. A switching control circuit of a power supply circuit that generates an output voltage from an alternating current (AC) voltage, the power supply circuit having
    a switching device, switching of which causes a disturbance voltage to be generated, and
    the switching control circuit, which is configured to control the switching of the switching device, so as to reduce a noise component included in a predefined resolution bandwidth among noise generated by the power supply circuit, as measured by a spectrum analyzer having a bandpass filter with the predefined resolution bandwidth,
the switching control circuit comprising:
    a frequency modulation circuit that generates an oscillator signal, and modulates the oscillator signal with
        a modulation frequency that is higher than a quarter of the predefined resolution bandwidth, and
        a modulation index of two or more, so as to attenuate the noise component included in the predefined resolution bandwidth; and
    a drive circuit that drives the switching device in response to a signal corresponding to the modulated oscillator signal.

2. The switching control circuit according to claim 1, wherein the modulation frequency is higher than a half of the predefined resolution bandwidth.

3. The switching control circuit according to claim 1, wherein the frequency modulation circuit sets a maximum frequency deviation of a frequency of the oscillator signal to be larger than the predefined resolution bandwidth.

4. The switching control circuit according to claim 1, wherein the modulation index of two or more is five or more.

5. The switching control circuit according to claim 4, wherein the frequency modulation circuit includes:
    a control circuit that outputs, as a control voltage, a sinusoidal voltage corresponding to the modulation frequency and the modulation index; and
    an oscillator circuit that receives the control voltage and outputs the modulated oscillator signal corresponding to the control voltage.

6. The switching control circuit according to claim 1, wherein
    the switching device is a device for power conversion provided between a power supply line and a ground.

7. The switching control circuit according to claim 1, wherein
    the switching control circuit performs switching of the switching device based on the output voltage generated from the AC voltage and an inductor current flowing through an inductor that is to be applied with a rectified voltage from a rectifier circuit for rectifying the AC voltage, the switching device being configured to control the inductor current.

8. The switching control circuit according to claim 7, further comprising:
    a first error voltage output circuit that outputs a first error voltage corresponding to a difference between a feedback voltage corresponding to the output voltage and a reference voltage;
    a multiplier circuit that multiplies the first error voltage by a voltage corresponding to the rectified voltage;
    a second error voltage output circuit that outputs a second error voltage corresponding to a difference between the inductor current and a multiplication result of the multiplier circuit; and
    a comparator circuit that compares the second error voltage and the modulated oscillator signal, wherein
    the drive circuit is configured to drive the switching device with a drive signal corresponding to a comparison result of the comparator circuit.

9. The switching control circuit according to claim 7, wherein
    the frequency modulation circuit modulates the oscillator signal to thereby reduce a ripple rate of the inductor current to below a predetermined value.

10. The switching control circuit according to claim 1, wherein the bandpass filter is in accordance with CISPR (International Special Committee on Radio Interference) 16-1 standard.

11. The switching control circuit according to claim 1, wherein the modulation frequency is 5 kHz.

12. The switching control circuit according to claim 1, wherein the modulation frequency is higher than 2.25 kHz.

13. The switching control circuit according to claim 1, wherein the modulation frequency is higher than 4.5 kHz.

14. The switching control circuit according to claim 1, wherein the modulated oscillator signal includes a plurality of signal waves having frequency components that differ from one another by an integer multiple of the modulation frequency.

15. The switching control circuit according to claim 14, wherein the plurality of signal waves include a first signal wave that is within the predefined resolution bandwidth and that has a center frequency corresponding to the oscillator signal.

16. The switching control circuit according to claim 15, wherein the plurality of signal waves further include a second signal wave and a third signal wave, the second and third signal waves being outside the predefined resolution bandwidth, a frequency component of the second signal wave being higher than that of the first signal wave by the modulation frequency, a frequency component of the third signal wave being lower than that of the first signal wave by the modulation frequency.

17. A power supply circuit configured to generate an output voltage from an alternating current (AC) voltage, the power supply circuit comprising:
    a rectifier circuit that rectifies the AC voltage;
    an inductor to which the rectified AC voltage from the rectifier circuit is applied;
    a switching device configured to control an inductor current flowing through the inductor, switching of which causes a disturbance voltage to be generated; and
    a switching control circuit that controls the switching of the switching device, so as to reduce a noise component included in a predefined resolution bandwidth among noise generated by the power supply circuit, as measured by a spectrum analyzer having a bandpass filter with the predefined resolution bandwidth, the switching control circuit including:
        a frequency modulation circuit that generates an oscillator signal, and modulates the oscillator signal with a modulation frequency that is higher than a quarter of the predefined resolution bandwidth, and a modulation index of two or more, so as to attenuate the noise component included in the predefined resolution bandwidth; and a drive circuit that drives the switching device, in response to a signal corresponding to the modulated oscillator signal.

18. The switching control circuit according to claim 17, further comprising:

a first error voltage output circuit that outputs a first error voltage corresponding to a difference between a feedback voltage corresponding to the output voltage and a reference voltage;

a multiplier circuit that multiplies the first error voltage by a voltage corresponding to the rectified voltage;

a second error voltage output circuit that outputs a second error voltage corresponding to a difference between the inductor current and a multiplication result of the multiplier circuit; and a comparator circuit that compares the second error voltage and the modulated oscillator signal, wherein the drive circuit is configured to drive the switching device with a drive signal corresponding to a comparison result of the comparator circuit.

19. The switching control circuit according to claim 17, wherein the frequency modulation circuit modulates the oscillator signal to thereby reduce a ripple rate of the inductor current to below a predetermined value.

20. The switching control circuit according to claim 17, wherein the modulation frequency is higher than 2.25 kHz.

21. The switching control circuit according to claim 17, wherein the modulation frequency is higher than 4.5 kHz.

* * * * *